United States Patent Office 3,538,383
Patented Nov. 3, 1970

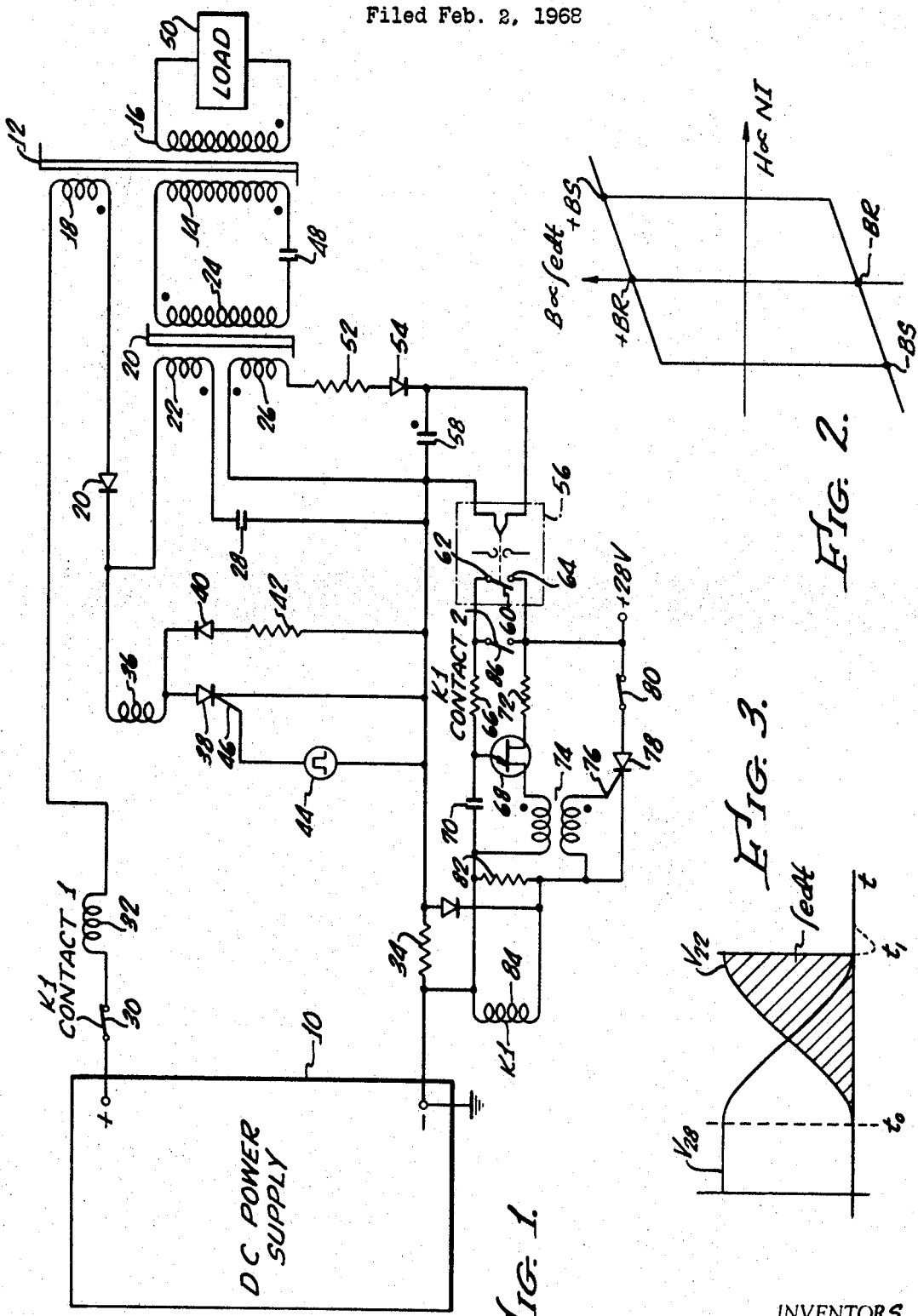

3,538,383
MAGNETIC PULSE GENERATOR PROTECTIVE DEVICE
Robert L. Ritter, Mission Viejo, and Ronald E. Hendries, Buena Park, Calif., assignors to Crescent Technology Corporation, a corporation of California
Filed Feb. 2, 1968, Ser. No. 702,702
Int. Cl. H02h 1/04, 3/12, 7/04
U.S. Cl. 317—22                    11 Claims

ABSTRACT OF THE DISCLOSURE

In a magnetic pulse generator having a charged pulse forming network, which transfers energy to a load, when a saturable transformer, connected in a series loop with the pulse forming network, becomes saturated; a protective device including a tertiary winding on the saturable transformer is provided whereby a shorted or open load—preventing transfer of the energy to the load and instead resulting in the charge on the pulse forming network discharging around the loop and reversing itself on the pulse forming network—is indicated by an induced voltage on the tertiary winding and wherein a switching means responsive to this induced voltage deactuates the pulse generator.

FIELD OF THE INVENTION

The present invention relates to magnetic pulse generators and more particularly to a protective device which senses an open or short circuit condition in the output load to de-actuate the pulse generator.

BACKGROUND OF THE INVENTION

Magnetic pulse generators are commonly used to drive magnetrons in radar systems. If the magnetron fails, it presents a continuous open or shorted load to the magnetic pulse generator. Severe damage may be incurred by the pulse generator due to extremely high internal currents if it continues to operate under these conditions. Accordingly, it is desirable to provide a protection device on the magnetic pulse generator which senses the condition of the output load to de-actuate the pulse generator if the load becomes opened or shorted.

Characteristically, however, the magnetron will present intermittent open or shorted load conditions to the pulse generator. A protective device, therefore, must differentiate between these routine faults and the continuous faults indicative of a bad magnetron and de-actuate the pulse generator only under the latter condition.

SUMMARY OF THE INVENTION

The present invention is a protective device for use in magnetic pulse generators. Such pulse generators are characterized by an electrical energy source that charges a charging capacitor connected in series with the energy source and with a primary winding on a first saturable transformer. Typically, the pulse generator also includes a discharge means connected in parallel with the series connected charging capacitor and primary winding which discharges the capacitor through the primary winding whereby its energy is transferred through the transformer to a capacitive pulse forming network connected in a series loop with the secondary winding of the first transformer and the primary winding of a second saturable transformer. Once the energy transfer has been completed the first transformer saturates providing a discharge path for the pulse forming network to discharge its energy through the second transformer into a load connected to the secondary winding of the second transformer. An open or shorted load on the pulse generator will prevent the energy transfer to the load causing the charge on the pulse forming network to discharge around the loop and reverse its polarity on the pulse forming network. The energy on the pulse forming network will then be transferred back through the first transformer.

The present invention provides a means for sensing this reverse energy transfer and deactivating the magnetic modulator comprising, in the preferred embodiment, a tertiary winding on the first transformer, a capacitor which stores the energy transferred through the tertiary winding and a switching means responsive to the time that the charge remains on the capacitor for deactuating the electrical energy source of the modulator.

Another feature of the present invention is that it discriminates between the inherent intermittent faults which occur in a magnetron and the continuous fault resulting from a bad magnetron which will damage the magnetic pulse generator unless it is deactuated. In the preferred embodiment, the switching means includes a thermal relay which is connected to the capacitor and which will actuate to deactuate the modulator energy source if the charge on the capacitor remains thereon for a predetermined period of time.

In this manner the pulse generator will not be deactuated unless the reverse energy transfer through the first transformer, due to the fault in the load, continues for the selected period of time required for the thermal relay to actuate.

In accordance with still another feature of the present invention, a resistor is advantageously connected in series with the energy source and with the parallel connection of the discharge means and charging capacitor. A high current in this path due to a malfunction of the discharge means for example results in a high voltage developed across the resistor. A relay connected across the resistor and having a first set of contacts in series with the energy source will actuate when this voltage appears temporarily deactuating the energy source. In addition a second set of contacts, which are normally open, will close when the relay actuates. A positive voltage potential is connected to one side of the second contact and is applied to a capacitor, which is connected to the other side of the contacts, when the contact closes. A latching means responsive to the voltage on the capacitor permanently actuates the relay deactuating the energy source once the voltage assumes a predetermined level. The voltage on the capacitor is proportional to the number of times the relay is actuated due to the excessive current from the energy source over a particular period of time. Varying the voltage level at which the latching means actuates varies the energy source overload condition that will be tolerated.

BRIEF DESCRIPTION OF THE FIGURES

FIG. 1 is a schematic diagram of a magnetic pulse generator and the preferred embodiment of the present invention;
FIG. 2 is a hysteresis loop or BH curve for the core of a saturable transformer; and
FIG. 3 is a graph showing selected voltage waveforms within the schematic of FIG. 1.

DESCRIPTION OF THE PREFERRED EMBODIMENT

In FIG. 1, there is shown a schematic diagram of a magnetic pulse generator and the preferred embodiment of the present invention. The magnetic pulse generator includes a D.C. power supply 10, the electrical energy source for the pulse generator, a saturable transformer 12 having a primary winding 14, a secondary winding 16 and a biasing winding 18, saturable transformer 20 having a primary winding 22, a secondary winding 24 and a tertiary winding 26, and a charging capacitor 28.

The power supply 10 charges the capacitor 28 through a charge path comprising normally closed relay contact 30, inductor 32, biasing winding 18, diode 20, primary winding 22, and resistor 34.

The energy stored on capacitor 28 is discharged through a discharge path comprising primary winding 22, inductor 36 and silicon controlled rectifier SCR, 38. A pulse source 44 is connected to gate 46 of SCR 38 and controls the discharge of capacitor 28.

The secondary winding 24 of transformer 20 is included in a series connected loop comprising primary winding 14 and a capacitive pulse forming network represented by capacitor 48. The secondary winding 16 of transformer 12 is the output of the magnetic pulse generator and is shown connected to load 50 which represents a magnetron.

The operation of the saturable transformers 12 and 20 in FIG. 1 can best be understood by referring to FIG. 2 where a hysteresis loop is a diagrammatic representation of the relationship between the magnetomotive force H and the flux condition B of a core. The magnetomotive force H is proportional to the number of turns N, in a winding and the current I, passing through the winding. The flux density B of the core is proportional to the integral of the voltage $e$, applied to a winding on the core with respect to time.

With no voltage applied to the winding on a core, no current flowing through the winding and with the magnetic pattern of the core material in a random condition, the core condition is represented by the intersection of the B and H axes. The application of a voltage to the core for a sufficient length of time will cause the flux in the core to increase to a point designated as $+B_s$ which is the saturation point of the core material. Further increases in the voltage-time integral applied to the core will not result in further increases in the flux density once the core has been saturated. If the magnetomotive force is reduced to zero while the core is saturated, the flux density of the core will be slightly reduced to a point designated $+B_r$. $B_r$ is the retentivity of the particular core material and will be maintained indefinitely until additional excitation is applied to the core. If a negative voltage is applied to the core, the flux in the core will be reversed and will saturate the core when point $-B_s$ is reached.

Assuming the core is employed as the core of a transformer having a primary and a secondary winding, it will be observed that a voltage applied to the primary which causes the flux in the core to increase will induce a voltage in the secondary winding. Once the core becomes saturated, however, the flux in the core will not change and the voltage in the secondary will become zero. It will also be observed that a back EMF will be developed by a winding on a core only so long as the flux in the core is changing. Therefore, when the core saturates due to a voltage applied on the winding the back EMF disappears and the winding suddenly appears as a short circuit. For example, assume that the voltage waveform designated in FIG. 3 as $V_{22}$ is applied to the winding 22 of saturable transformer 20. When the area beneath the curve, the integral of the voltage with respect to time, reaches the value necessary to saturate the core, the impedance of the winding 22 becomes negligible and the voltage developed by the winding becomes zero at time $t_1$ as shown in the figure. The voltage induced in the secondary winding 24 will have the same wave shape as the voltage applied to the primary 22 but will vary in magnitude depending upon the turns ratio between the windings 22 and 24.

Referring again to FIG. 1, power supply 10 will charge charging capacitor 28 with a charge current which flows through winding 18 on saturable transformers 12 and 22 of transformer 20. Saturable transformers 12 and 20 are designed so that winding 18 and 22 will have a sufficient number of turns for the charging current, determined by the inductance, capacitance and resistance in the charge path, to saturate the cores of the transformers 12 and 20.

In order to designate the interrelation of the windings on each of the transformers 12 and 20, a dot convention is employed. One terminal of each winding on the transformers is shown dotted. In accordance with this dot convention, when the core of a transformer is saturated by a current flowing through a winding and out of a dotted terminal, the other windings on the same core will have a low impedance for currents flowing out of the dotted terminals of the windings but will present a normal impedance to current flowing in the opposite direction. In a like manner, if a current into a dotted terminal of a winding on the transformer core saturates the core, the remaining windings on the transformer will have a low impedance for currents flowing into the dotted terminals. For example, when the charge current for capacitor 28 saturates the transformer 12 to its $+B_s$ point on the BH curve by passing through winding 18 and out of its dotted terminal, the winding 14 will present a low impedance for current flowing out of its dotted terminal. If, however, a voltage is applied which is positive at the dotted terminal with respect to the undotted terminal of winding 14, the winding presents a normal impedance to current flow. A voltage of this polarity drives the flux in the core toward $-B_s$. Thus, a back EMF is developed which impedes current flow.

As previously discussed, when charging capacitor 28 has been charged by power supply 10, it may be discharged by a discharge means including pulse source 44 which is connected to gate 46 of SCR 38 and forward biases SCR 38 providing a discharge path for capacitor 28.

Referring to FIG. 3, there is shown a voltage waveform designated $V_{28}$ which represents the voltage on capacitor 28. At time $t_0$, when capacitor 28 is fully charged, the pulse source 44 applies a pulse to gate 46 of SCR 38 discharging capacitor 28. The curve $V_{22}$ represents the voltage applied across winding 22 of saturable transformer 20 as the charging capacitor 28 is discharged. As capacitor 28 discharges through winding 22, the voltage across the winding increases from $t_0$ to time $t_1$. During this period of time, a voltage having the same waveform as that on winding 22 is induced in winding 24. The voltage applied across winding 22 is positive at its dotted terminal and therefore, the induced voltage in winding 24 is positive at its dotted terminal and generates a current which flows through the winding 14 to charge the capacitive pulse forming network shown as capacitor 48. Since the core of transformer 12 was saturated by the charging current which flowed through winding 18, the winding 14 will be a low impedance for the current as it flows from the undotted to the dotted terminal of winding 14. Accordingly, all of the energy which was stored on capacitor 28 and induced into the core of transformer 20, during time $t_0$ to time $t_1$ shown in FIG. 3, will be stored on capacitor 48.

The core of transformer 20 will become saturated when the integral of the voltage applied to winding 22 with respect to time becomes the value shown at time $t_1$ in FIG. 3. The saturation of the core of transformer 20 causes the impedance of the secondary winding 24 to become approximately zero for current from its dotted to its undotted terminal. The voltage on capacitor 48 therefore will have a discharge path resulting in a current into the dotted terminals of winding 14 and winding 24.

The core of transformer 12 which was saturated to $+B_s$ by the charge current for capacitor 28 presents a high impedance to the discharge of capacitor 48 through winding 14. The voltage on capacitor 48 is applied across winding 14 when transformer 20 saturates. The flux in transformer 12 is driven negative by the voltage applied to winding 14, therefore inducing a voltage in the secondary winding 16. The energy stored on capacitor 48 is accordingly transferred through the transformer 12 and into the load 50.

To summarize the operation of the magnetic pulse generator, then, power supply 10 charges capacitor 28 with a charge current which saturates the core of transformer 12. A pulse applied to the gate 46 of SCR 38 discharges the capacitor 28 through winding 22 of transformer 20. The energy stored in capacitor 28 is transferred through transformer 20 to the capacitive pulse forming network 48. A predetermined period of time after the initiation of the discharge of capacitor 28, the core of transformer 20 saturates providing a discharge path for the voltage on pulse forming network 48. The energy stored in pulse forming network 48 is transferred to the load through transformer 12 when transformer 20 saturates. After capacitor 28 has been discharged, a negative voltage will appear across capacitor 28 due to the relative values of capacitor 28 and capacitor 48. The negative voltage will shut off the latching current through SCR 38 to allow the power supply 10 to recharge capacitor 28.

In an exemplary magnetic pulse generator, the output pulse to load 50 is approximately 13 kv. and 5 microseconds in duration. The repetition rate of pulse source 44 is 200 pulses per second and power supply 10 charges capacitor 28 to 500 volts. The discharge of capacitor 28 occurs within 20 microseconds charging capacitive pulse forming network 48 to 8 kv. In such a pulse generator it can be seen that the 5 microsecond pulse to the load 50 results from the 20 microsecond discharge time of capacitor 28 being compressed to a 5 microsecond discharge of capacitor 48.

The load 50 on the magnetic pulse generator may be a magnetron used in a radar system. Magnetrons inherently will present intermittent open or shorted load conditions to the output of the magnetic pulse generator. A magnetron which is going bad may present open or shorted load conditions to the pulse generator for continuous periods of time. A continuous open or shorted load across secondary winding 16 of transformer 12 will result in damage to the internal circuitry of the magnetic pulse generator. For example, assume the load 50 is a short circuit across winding 16, it can be seen that since the impedance of winding 14 on transformer 12 is the impedance of load 50 times the turns ratio squared of transformer 12, the primary winding 14 will appear as a short circuit. Therefore the discharge of capacitor 48 when transformer 20 saturates will not result in the transfer of its energy through transformer 12. The charge on capacitor 48 will instead discharge through windings 14 and 24 back around upon itself. Once the charge on capacitor 48 has been reversed, it will then tend to ring around again. However, the impedance of winding 24 is very high for a current into the undotted terminal of winding 24. The second discharge of capacitor 48 through winding 24 will therefore result in a voltage being induced into the primary winding 22. This voltage will charge capacitor 28 which stores the energy transferred in reverse from capacitor 48 through transformer 20. The resulting charge on capacitor 28 will be approximately the same as it was when it discharged initially but the polarity will be reversed. The 500 volts on capacitor 28 will appear across SCR 38. This magnitude of negative voltage across SCR 38 can be sufficiently high to damage it. Temporary protection for SCR 38 is provided by the series connected diode 40 and resistor 42 which clamps the anode of SCR 38 to a value such that the voltage differential from the cathode to the anode is not high enough to damage it. If, however, the load 50 remains shorted for a long period of time, for example 25 seconds, the resistor 42 may burn out thus removing the temporary protection for SCR 38.

Assuming the load 50 was to present an open circuit load condition to winding 16 the same damage would be incurred by the magnetic pulse generator as was described in conjunction with a shorted load condition. If the load 50 becomes an open circuit no energy will be transferred from the capacitor 48 through the transformer 12 when it discharges. The voltage developed across winding 14 will rise to approximately double what it is under normal load conditions and will saturate the core of transformer 12. Under these conditions the energy on capacitor 48 will reverse itself as previously discussed and then tend to ring back around the loop resulting in the transfer of energy back through transformer 20 to capacitor 28.

Occasional short or open load conditions may be tolerated by the magnetic pulse generator due to the clamping effect of resistor 42 and diode 40 across SCR 38. A continuous fault in the load 50, however, will have deleterious effects on the magnetic pulse generator as previously described. Accordingly the present invention provides a means for discriminating between intermittent load faults and continuous load faults to deactuate the power supply 10 under the latter conditions. The present invention comprises a means for sensing a fault in the load 50 and a means for deactuating the power supply 10.

An open or shorted load condition on the output of the magnetic pulse generator which results in the charge on capacitor 48 being reversed and the energy contained thereon transferring back through transformer 20 is detected by a voltage which is induced into a tertiary winding 26. The discharge of capacitor 48 through the undotted terminal of winding 24 to its dotted terminal induces a negative voltage in winding 26 in accordance with the dot convention. That is, the dotted terminal of winding 26 is negative with respect to its undotted terminal. A resistor 52, diode 54 and thermal relay 56 are connected in series across the terminals of winding 26. A capacitor 58 is connected from the cathode of diode 54 to the return path of the D.C. power supply 10. The positive voltage induced at the undotted terminal of winding 26 forward biases the diode 54 and charges capacitor 58. A fault in the load 50 then will result in capacitor 58 being charged positive at its dotted plate as seen in the figure thus storing a portion of the energy transferred by capacitor 48 through transformer 20 in the reverse direction.

Thermal relay 56 is designed so that a current through its terminals will actuate it in, for example, approximately 5 seconds. If the voltage on capacitor 58 remains there for this period of time, thermal relay 56 will actuate due to the discharge current of capacitor 58 through it. Relay 56 will then actuate only if load 50 maintains a fault condition for 5 seconds. The intermittent faults which occur in a magnetron will charge capacitor 58 but the charge will not remain on the capacitor for the required 5 seconds. Therefore, relay 56 will not be actuated for the normal magnetron faults. In this manner, the present invention distinguishes between the inherent faults of the magnetron and continuous faults of the magnetron, the latter indicating the magnetron is failing.

The actuation of relay 56 will close switch 60 contained in the relay. Terminal 64 of switch 60 is connected to a +28 volt potential. Terminal 62 of the relay is connected to the emitter of a unijunction transistor 68 through a resistor 66. A capacitor 70 is connected between the emitter of unijunction transistor 68 and ground. Base two of transistor 68 is connected to the +28 volt potential through resistor 72, and base one is connected to the primary winding of pulse transformer 74. The secondary winding of transformer 74 is connected to the gate 76 of SCR 78. The anode of SCR 78 is connected to the +28 volt potential through a switch 80. The cathode of SCR 78 is connected to ground through resistor 82. When SCR 78 is turned on by a positive pulse applied to its gate 76, the 28 volt potential on its anode is connected across the resistor 82. Coil 84 of relay K1 is connected in parallel with resistor 82. Relay K1 will be actuated when resistor 82 has a 28 volt potential across it. Relay K1 has two sets of contacts, switch 30, which is normally closed, in the charge path for charging capacitor 28 and switch 86, normally open, in parallel with switch 60 in relay 56. The actuation of relay K1 will open switch 30 and close switch 86.

Returning now to the condition where a voltage on capacitor 58 has resulted in the actuation of relay 56. The 28 volt potential connected to switch 60 is connected to ground through resistor 66 and capacitor 70. After a period of time, the voltage on capacitor 70 will be sufficient to turn on unijunction transistor 68. Transistor 68 will place a positive potential on the primary winding of transformer 74 when it is turned on which will result in a voltage pulse being induced in the secondary winding of transformer 74. A pulse from transformer 74 to gate 76 turns on SCR 78 connecting the 28 volts on its anode across resistor 82 actuating relay K1. Switch 30 will open when relay K1 is actuated thus deactuating the power supply 10 removing it from the charge path.

In addition to protecting the magnetic pulse generator from faults in the load 50 the present invention is also adapted to protect the pulse generator from a bad pulse source 44 or from any other malfunction in the circuits which results in a high current being drawn from power supply 10. If for example, pulse source 44 produces pulses at too rapid a rate so that the SCR 38 is on almost continuously or if SCR 38 malfunctions by not shutting off, a short circuit is effectively placed across the output terminals of power supply 10 resulting in a high current drain. This current may damage either the power supply 10 or other elements in the circuit. Accordingly, a resistor 34 in the return path for the power supply 10 is connected in parallel across the solenoid winding 84 of relay K1. If the voltage dropped across resistor 34 becomes approximately 28 volts, relay K1 will actuate opening switch 30 in the charge path and closing switch 86. Switch 30 will break the short circuit across the terminals of power supply 10 and reduce the voltage drop across resistor 34. At the same time, the closing of switch 86 will connect a 28 volt potential through resistor 66 and capacitor 70 to ground. When the potential drop across resistor 34 decreases after switch 30 has been opened the relay K1 will become deactuated closing switch 30 and opening switch 86. The temporary actuation of relay K1 will result in a charge being built up on capacitor 70. One actuation of relay K1 is not sufficient to result in a high enough voltage build up on capacitor 70 to turn on transistor 68. The values of resistor 66 and capacitor 70 may be selected so that transistor 68 will turn on after relay K1 has been actuated a predetermined number of times during a particular time period. If transistor 68 is turned on SCR 78 will again become forward biased due to the pulse through pulse transformer 74 and will latch the 28 volt potential across resistor 82 actuating relay K1 permanently.

Once SCR 78 has been turned on due either to the actuation of the thermal relay 56 or to the voltage build up across capacitor 70 due to the several actuations of relay K1 it will remain conducting until the latch current from its anode to its cathode has been removed. Accordingly, switch 80 is provided between the anode of SCR 78 and the 28 volt potential. The switch 80 must be opened once SCR 78 is conducting in order to restore the relay K1 to its deactuated position.

We claim:

1. In a magnetic pulse generator wherein a charged capacitive pulse forming network is series connected in a loop which includes a secondary winding of a first saturable transformer and a primary winding of a second saturable transformer, and wherein energy is transferred from the pulse forming network to a load connected across a secondary winding of the second transformer when the first saturable transformer saturates, a protective device for deactuating the pulse generator when the load connected across the secondary winding of the second transformer becomes open or shorted resulting in the charge on the pulse forming network reversing itself and transferring energy through the first saturable transformer comprising:
   a tertiary winding on the first transformer having a potential induced in it when the load becomes open or shorted;
   a capacitor connected to the tertiary winding and being charged when the potential appears on the tertiary winding;
   a thermal relay responsive to the charge on the capacitor and being actuated if the charge on the capacitor remains for a predetermined period of time; and
   switching means operatively connected to the thermal relay for deactuating the pulse generator when the thermal relay is actuated.

2. In a magnetic pulse generator having a charged pulse forming network which transfers energy to a load upon saturation of a saturable transformer connected in a loop with the pulse forming network, a protective device for deactuating the pulse generator when the load malfunctions resulting in the charge on the pulse forming network being discharged around the loop to reverse the polarity of the charge on the pulse forming network comprising:
   a sensing means for sensing the reversal of the charge on the pulse forming network and having a voltage output when the charge reversal occurs; and,
   means responsive to the voltage output of the sensing means for deactuating the pulse generator.

3. The apparatus described in claim 2 wherein the sensing means comprises a tertiary winding on the transformer.

4. The apparatus of claim 3 wherein said protective device deactuates the pulse generator only when the load malfunctions for a predetermined period of time, said protective device further comprising:
   a capacitor connected to the tertiary winding and charging when the charge on the pulse forming network reverses; and
   switching means responsive to the charge on the capacitor for deactuating the pulse generator if the charge remains on the capacitor for a predetermined period of time.

5. The apparatus of claim 4 wherein the switching means includes:
   a thermal relay connected across the capacitor which actuates if the charge remains on the capacitor for a predetermined period of time.

6. The apparatus of claim 5 wherein switching means further includes latching means comprising:
   a silicon controlled rectifier responsively coupled to said thermal relay and becoming conductive when the thermal relay is actuated; and,
   a relay coupled to said silicon controlled rectifier and being actuated when the rectifier becomes conductive, said relay having a contact which, when the relay is actuated, deactuates the pulse generator.

7. The apparatus of claim 6 wherein the magnetic pulse generator further includes:
   an electrical energy source which charges a capacitor connected in series with the energy source and the primary winding of the saturable transformer,
   a discharge means connected in parallel with the series connected capacitor and primary winding for discharging the capacitor, and
   a resistor connected in series with the energy source and the parallel connection of the discharge means and the capacitor, said relay being connected in parallel with said resistor so that an excessive current flow from the energy source actuates the relay to momentarily deactuate the pulse generator.

8. The apparatus as described in claim 7 wherein said relay includes a second normally open contact connected to a positive voltage potential, said apparatus further including a capacitor connected to said second contact so that a charge builds up on the capacitor when the relay is actuated, means coupling said silicon controlled rectifier to said capacitor so that said silicon controlled rectifier is forwardly biased when a predetermined voltage is reached across said capacitor (following a predetermined plurality of actuations of said relay) resulting in latching of said relay in an actuated condition.

9. In a magnetic pulse generator having an electrical energy source for charging a capacitor connected in series with the energy source and a discharge means in parallel with the capacitor for discharging the capacitor to transfer its energy to a load, a protective device for deactuating the electrical energy source if a malfunction occurs resulting in a high current being drawn from the electrical energy source comprising:
- a resistor connected in series with the electrical energy source and the parallel connection of the discharge means and the capacitor, a malfunction in the pulse generator which draws a high current from the electrical energy source resulting in a voltage drop across the resistor;
- a relay connected in parallel with the resistor which is actuated momentarily when the voltage drop across the resistor exceeds a predetermined level, actuation of the relay deactuates the electrical energy source and stops the current flow reducing the voltage drop across the resistor, and
- a latching means for permanently actuating the relay after the relay has been actuated a predetermined number of times within a predetermined time period.

10. In a magnetic pulse generator having a chargeable pulse forming network, means for rapidly charging said network including a power supply and saturable transformer, and a load coupled to said charged pulse forming network, protection means for disconnecting said power supply when either said load malfunctions or excessive power is drawn from said power supply because of a malfunction within said pulse generator, and including first means including an additional winding on said saturable transformer for sensing a malfunction in said load, second means coupled to said power supply for sensing an excessive power drain therefrom, switching means for disconnecting said power supply from said magnetic pulse generator, time delay means coupling said first means to said switching means so that said power supply is disconnected in response to a continuous, rather than intermittent, malfunction of said load, and means coupling said second means to said switching means for disconnecting said power supply whenever an excessive power drain is sensed.

11. The magnetic pulse generator of claim 10 including latching means responsive to said first and second means and operatively coupled to said switching means for continuously disconnecting said power supply when either said load malfunction exceeds the time interval of said time delay means or said excessive power drain has resulted in plural successive disconnections of said power source.

References Cited

UNITED STATES PATENTS

| | | | |
|---|---|---|---|
| 3,277,342 | 10/1966 | Ross | 317—51 X |
| 3,405,321 | 10/1968 | Staples | 331—62 X |
| 3,435,249 | 3/1969 | Farrell | 307—108 X |

JAMES D. TRAMMELL, Primary Examiner

U.S. Cl. X.R.

307—108, 284; 317—33, 39, 49; 331—62